United States Patent [19]
Chou

[11] Patent Number: 5,650,566
[45] Date of Patent: Jul. 22, 1997

[54] PRESSURE GAUGE SHOWING A CURRENT AND A PRESET PRESSURE

[76] Inventor: J. P. Chou, 6F-6, 186, Section 1, Wen Hsin Road, Taichung, Taiwan

[21] Appl. No.: 695,583

[22] Filed: Aug. 12, 1996

[51] Int. Cl.⁶ .................................................. G01D 11/24
[52] U.S. Cl. ............................ 73/431; 116/293; 116/297; 73/700
[58] Field of Search ...................... 73/431, 700; 116/293, 116/297, 290, 291, 292, 296

[56] References Cited

U.S. PATENT DOCUMENTS

| | | | |
|---|---|---|---|
| 877,314 | 1/1908 | Fee | 116/293 |
| 2,941,498 | 6/1960 | Teter | 116/293 |
| 3,016,308 | 1/1962 | Stiens | 116/293 |
| 3,089,340 | 5/1963 | Hageman | 116/293 |
| 3,242,732 | 3/1966 | Fritz | 73/431 |
| 4,196,690 | 4/1980 | Alinari | 116/293 |

*Primary Examiner*—George M. Dombroske
*Assistant Examiner*—Paul D. Amrozowicz

[57] ABSTRACT

A pressure gauge includes a base portion on which a cap is mounted, the base portion having a first indicating needle rotatably disposed to a center thereof, a frame disposed to the base portion and having two tubes extending therefrom, two activating bars and a second indicating needle mounted to the two tubes, each of the two activating bars having an extending plate pivotally connected thereto, the cap having a setting device disposed thereto so as to rotate the second indicating needle together with a higher extending plate, the lower extending plate together with the first indicating needle moved to a position where the lower extending plate is magnetically connected to the higher extending plate so as to stop an increment of a pressure.

1 Claim, 5 Drawing Sheets

PRESSURE GAUGE SHOWING A CURRENT AND A PRESET PRESSURE

BACKGROUND OF THE INVENTION

1. Field of the Invention

The present invention relates to a pressure gauge and more particularly, to an improved pressure gauge having two major functions, one of which is to show the present pressure of a piping system and the other of which is to show a preset pressure.

2. Brief Description of the Prior Art

In a piping system, such as in a hydraulic system, there needs a lot of gauges disposed to desired positions of the piping system and some sections of the system may be designed to allow only a certain pressure, i.e. the certain pressure must lower a preset standard pressure which should be shown such that operators can check the pressure all the time for the sake of safety. A conventional way to show the current pressure and the standard pressure in a piping system is shown in FIG. 1 wherein a first gauge 1 is used to show a preset standard pressure and a second gauge 6 is used to show the current pressure in the position where the second gauge 6 is disposed. However, such a way has the inherent shortcomings:

(1). The assembler must prepare at least two gauges, the first gauge and the second gauge, then the current pressure and the preset standard pressure are shown.

(2). It takes time to operate the first gauge and the second gauge separately.

(3). The current pressure is shown in the second gauge and the preset standard pressure is shown in the first gauge such that one must compare the two datum through calculation.

(4). It is experienced that such an arrangement has an inaccuracy up to 15%.

The present invention intends to provide an improved pressure gauge which has two sets of indicating needles, one of which shows the preset standard pressure and the other of which shows the current pressure so as to mitigate and/or obviate the above-mentioned problems.

SUMMARY OF THE INVENTION

The present invent ion provides a pressure gauge which includes a base portion and a cap mounted to the base portion. A first indicating needle has an L-shaped configuration with a horizontal portion rotatably disposed to the base portion and a vertical portion wherein a first rod extends from the horizontal portion. A longitudinal frame is disposed to the base portion by fixedly disposed two lateral lugs to the base portion. The frame has two tubes extending upwardly therefrom and each of the tubes has an inner threaded periphery defined therein.

A first activating bar has a first extending plate pivotally connected to one end thereof, the first activating bar having two second holes defined therein. A second activating bar has a second extending plate pivotally connected to one end thereof, the second extending plate having a magnetic element disposed thereto and the second activating bar having two third holes defined therein. The second extending plate has a fourth hole defined therein.

A preset bar has a third extending plate pivotally connected to one end thereof, the third extending plate having a second rod perpendicularly disposed thereto. The second rod comprises a front section extending from a front surface of the third plate and a rear section extending from a rear surface of the third plate wherein the rear section is received in the fourth hole of the second extending plate. The preset bar has two fifth holes defined therein.

An indicating plate has at least one mark disposed to the front surface thereof and a passing hole is defined therein, a tongue extending inwardly and radially from an inner periphery defining the passing hole.

Two bolts each extend through the tongue of the indicating plate, the fifth hole, the third hole, the second hole and threadedly engage with the inner threaded periphery of the tube corresponding thereto wherein the first rod extending higher than the first extending plate and lower than the second extending plate. Both of the vertical portion of the first indicating needle and a second indicating needle extending from the third extending plate extend through the passing hole of the indicating plate so as to respectively point to a mark on the indicating plate.

A cap has a transparent plate disposed on a front end thereof and a rear end of the cap is to receive the base portion therein, the transparent plate having a sixth hole defined in a center thereof. A threaded rod is disposed through the sixth hole of the transparent plate and has a core slidably disposed through the threaded rod. The core has a transverse bar connected to an end thereof in the cap and a nut threadedly engaged with the threaded rod form outside of the cap. A push rod extends through the nut and is engaged to the other end of the core such that when pushing the push rod into the cap, the transverse bar is lowered so as to rotate the second indicating needle together with the second extending plate.

It is an object of the present invention to provide pressure gauge in which a preset pressure and a current pressure are both shown.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
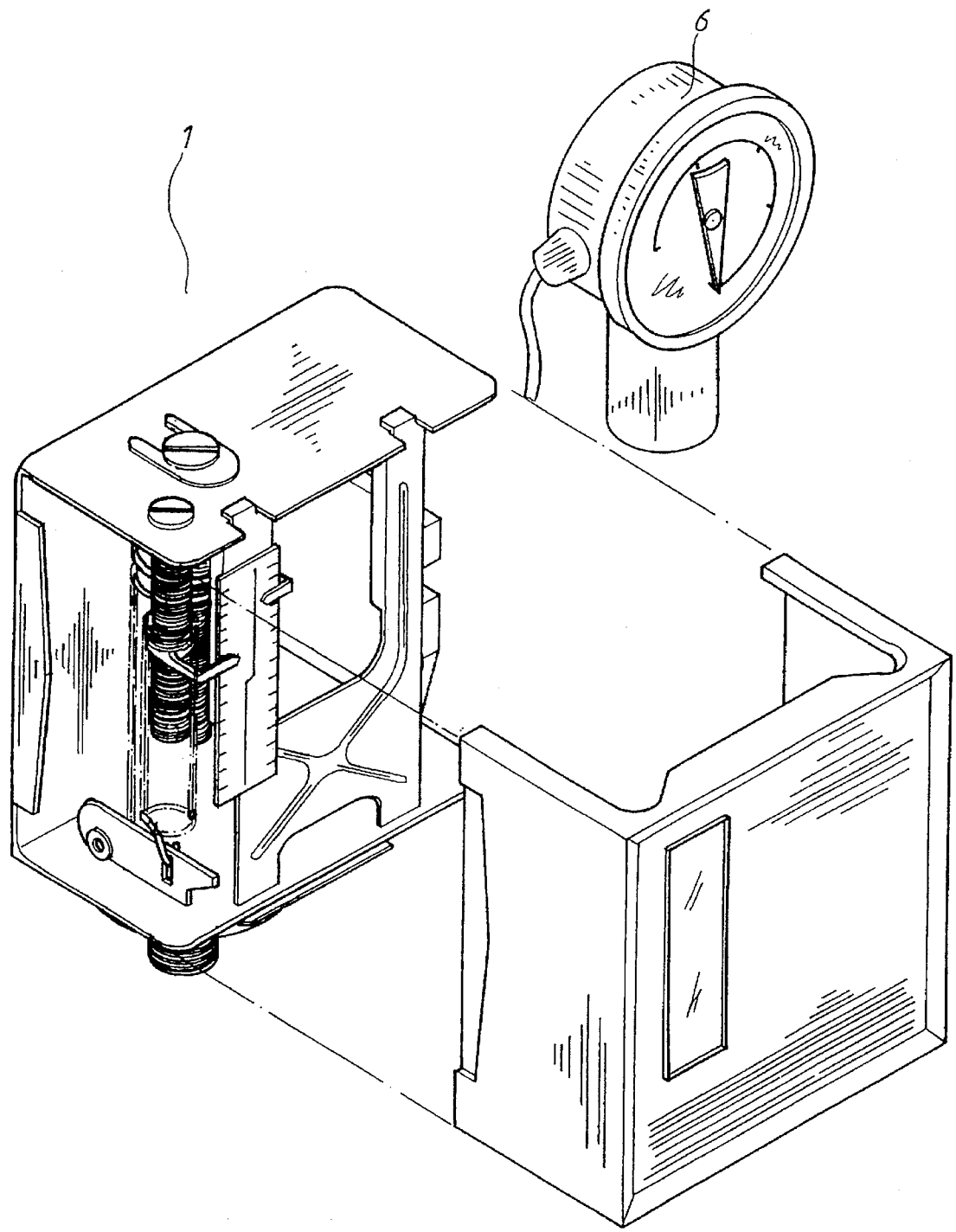
FIG. 1 is a perspective view to show two gauges used in the conventional manner to respectively show a preset pressure and a current pressure.
Figure 2:
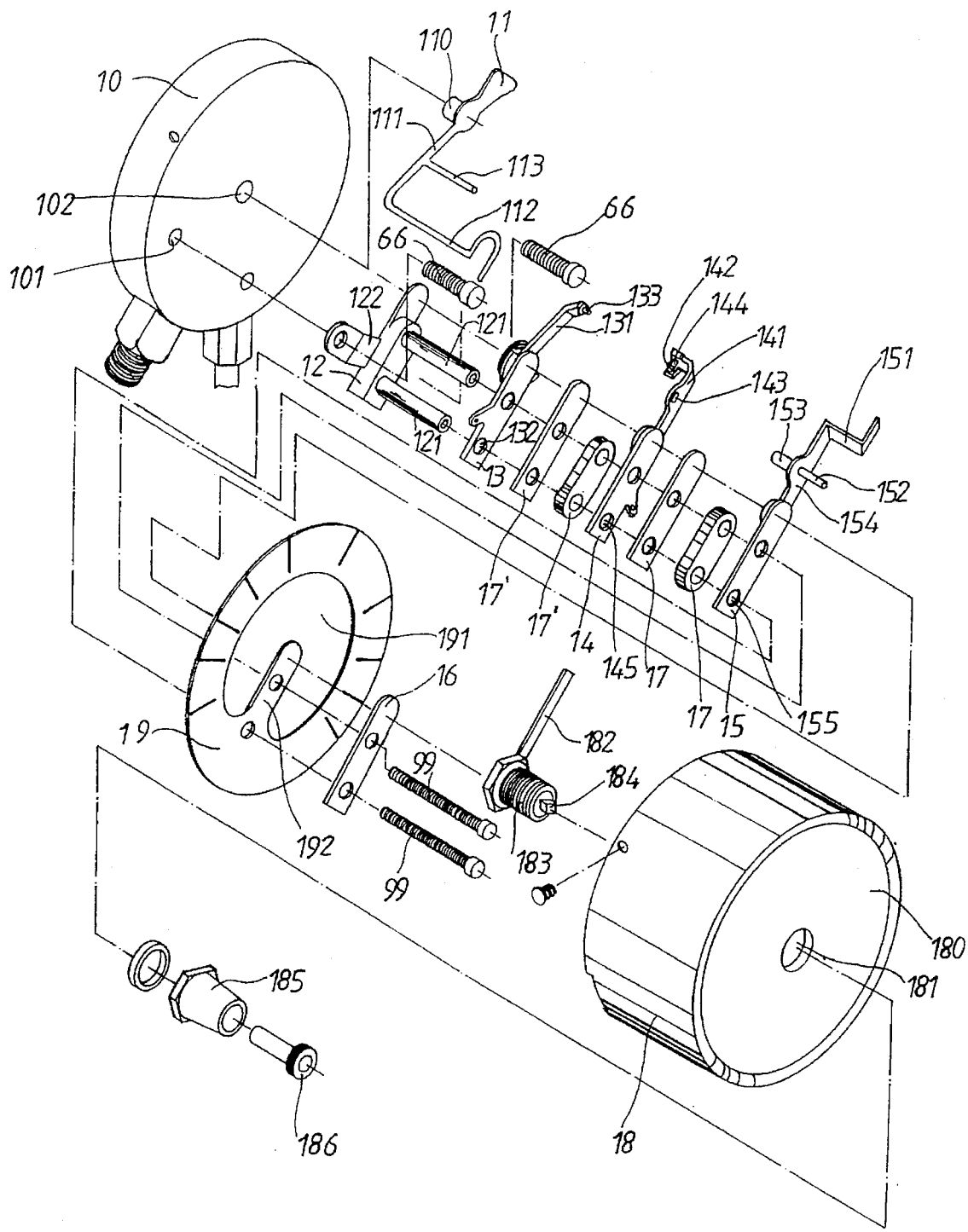
FIG. 2 is an exploded view of pressure gauge in accordance with the present invention.
Figure 3:
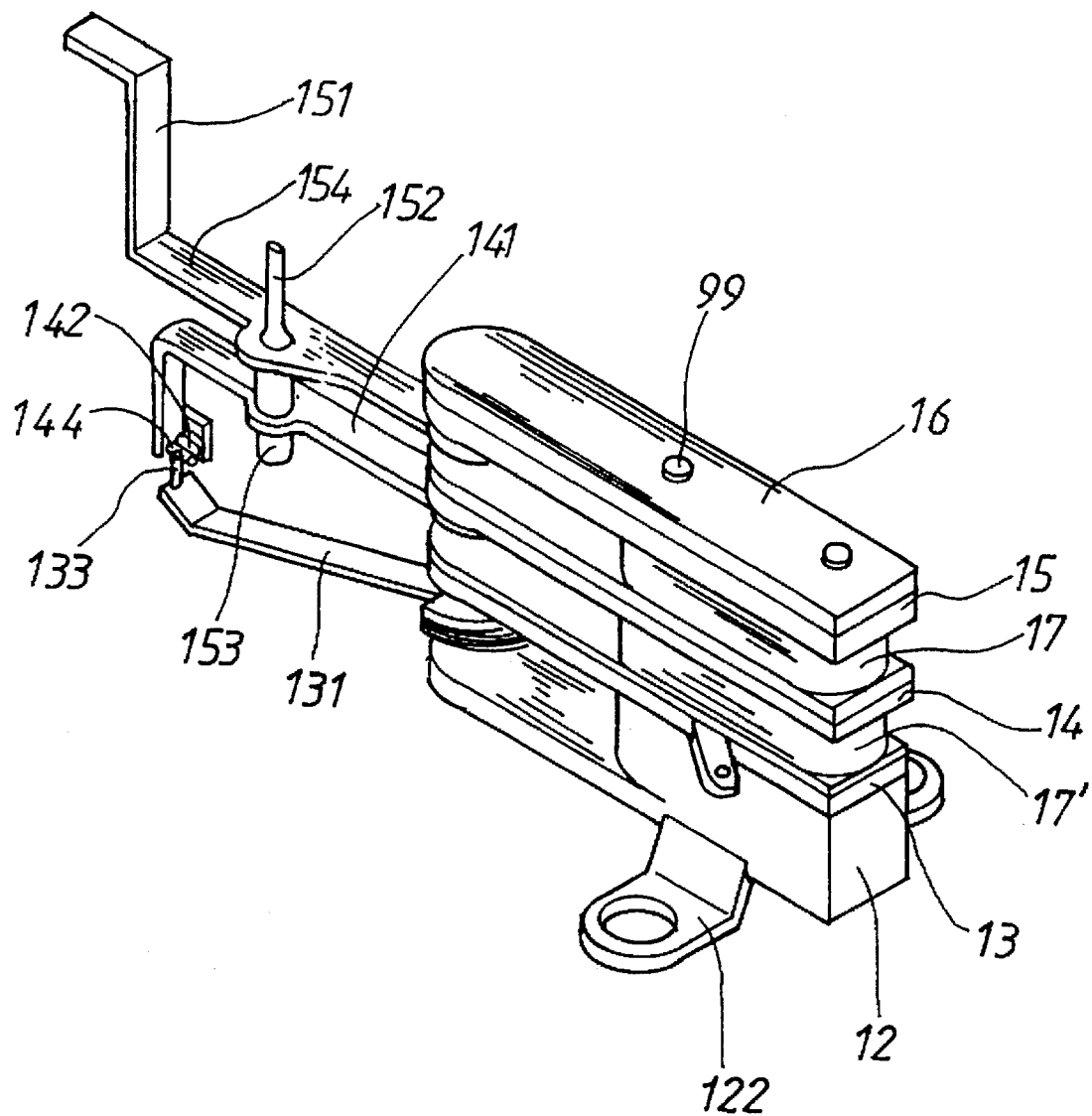
FIG. 3 is a perspective view of an assembly of the elements disposed to a base portion.
Figure 4:
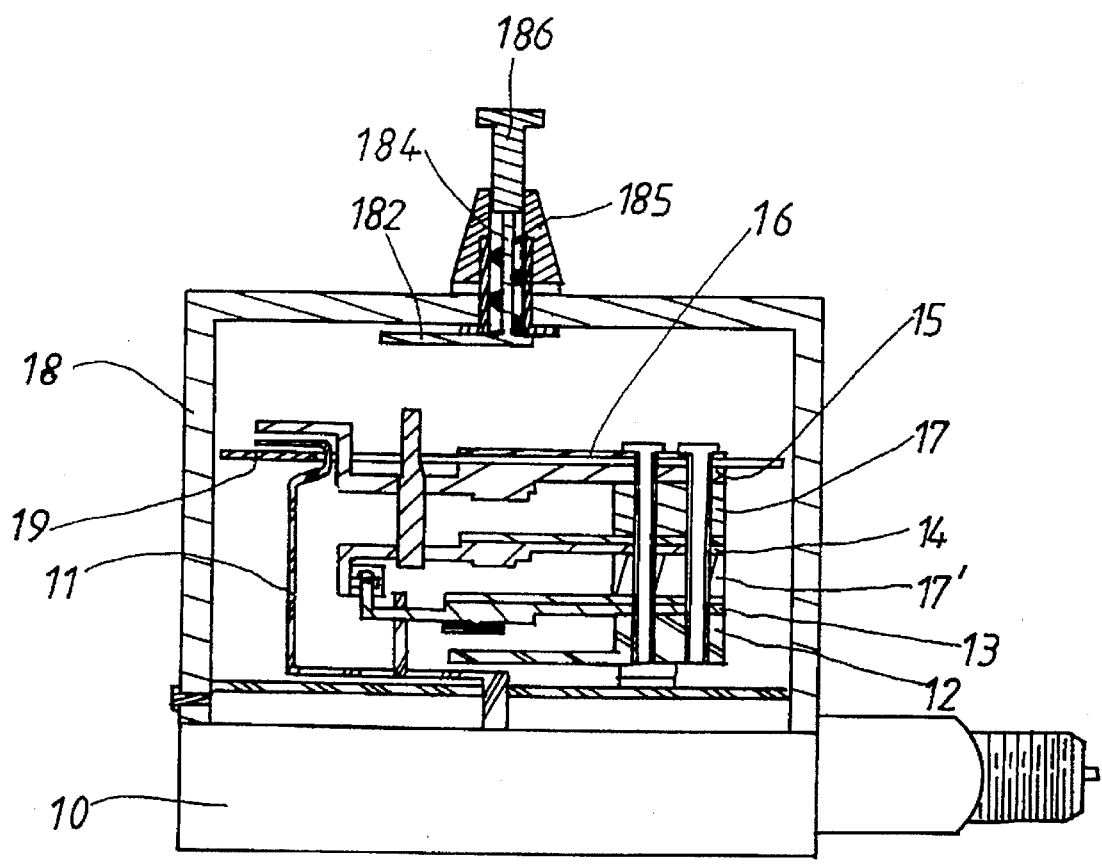
FIG. 4 is a side elevational view, partly in section, of the assembly of the elements received between the base portion and the cap.
Figure 5:
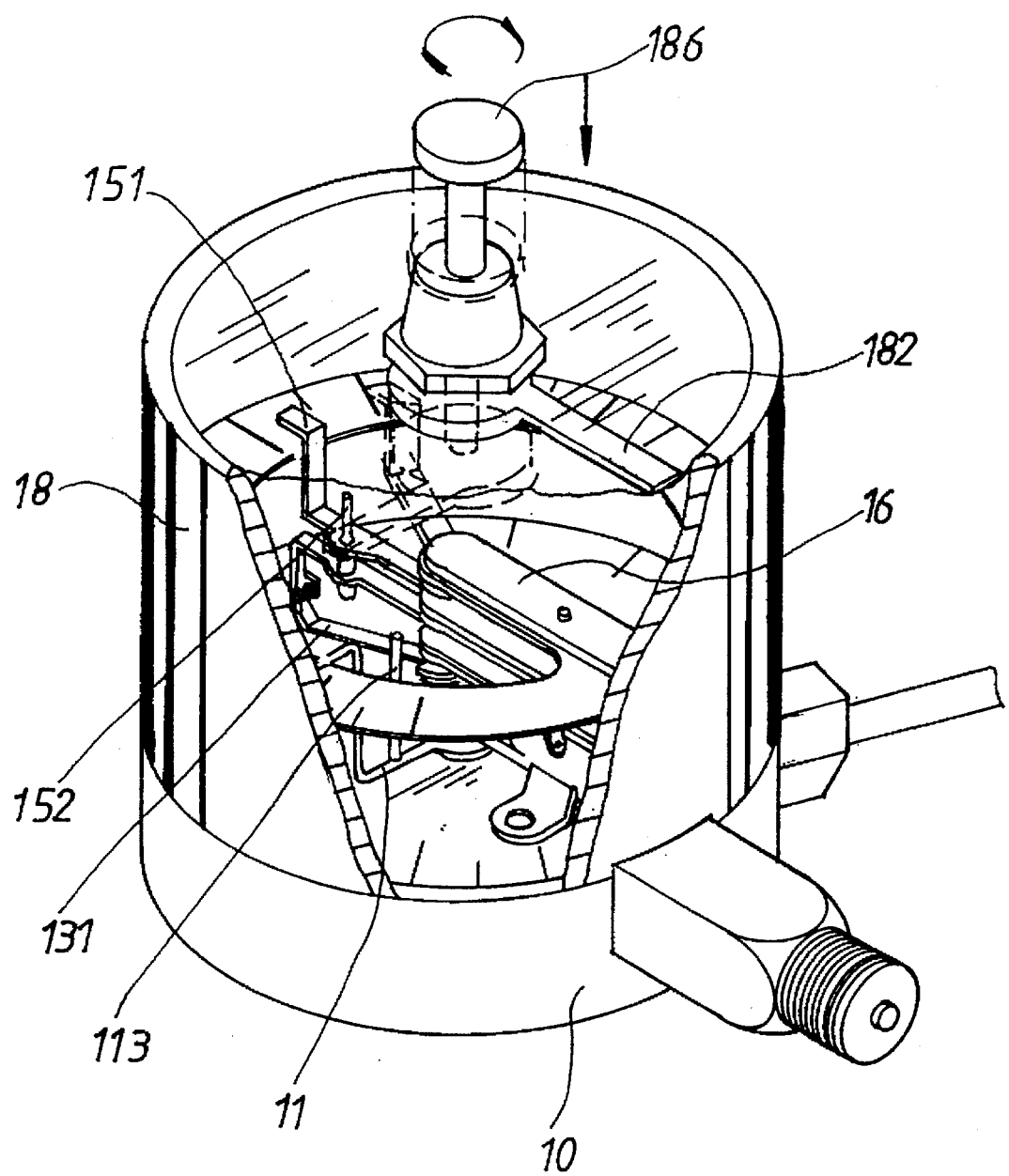
FIG. 5 is a perspective view to show a push rod is pushed into the cap and to rotate a preset bar.

Referring to the drawings from FIGS. 2 to 4, a pressure gauge in accordance with the present invent ion generally includes a base portion 10 having a front surface and a rear surface, a control means (not shown) is disposed in the base portion 10. Two pipe connections extend separately from a periphery thereof so as to connect to the piping system (not shown). The front surface or the base portion 10 has two first holes 101 and a central hole 102 defined therein.

A first indicating needle 11 has an L-shaped configuration with a horizontal portion 111 and a vertical portion 112 wherein a protrusion 110 extends from the horizontal portion 111 and is rotatably received in the central hole 102, a first rod 113 extending from the horizontal portion 111.

A frame 12 is a longitudinal element and a lug 122 extends laterally from each one of two sides thereof so as to be fixedly disposed on the front surface by extending a bolt 66 through each of the lugs 122 and threadedly engaged with the first hole 101 corresponding thereto. The frame 12 has two tubes 121 extending upwardly therefrom and each of the tubes 121 has an inner threaded periphery defined therein.

A first activating bar 13 is a longitudinal element and has a first extending plate 131 pivotally connected to one end thereof, the first activating bar 13 having two second holes 132 defined therein.

A second activating bar 14 is a longitudinal element and has a second extending plate 141 pivotally connected to one end thereof, the second extending plate 141 having a magnetic element 142 and a stop rod 144 disposed thereto. The second activating bar 14 has two third holes 145 defined therein and the second extending plate 141 has a fourth hole 143 defined therein.

A preset bar 15 is a longitudinal element and has a third extending plate 154 pivotally connected to one end thereof, the third extending plate 154 having a second rod perpendicularly disposed thereto. The second rod comprises a front section 152 extending from a front surface of the third extending plate 154 and a rear section 153 extending from a rear surface of the third extending plate 154. The rear section 153 is received in the fourth hole 143 of the second extending plate 141 and the preset bar 15 has two fifth holes 155 defined therein.

An indicating plate 19 has a plurality of marks disposed to the front surface thereof and a passing hole 191 is defined therein, a tongue 192 extending inwardly and radially from an inner periphery defining the passing hole 191. Every two adjacent elements mentioned above has a suitable numbers of dividers 17 disposed therebetween.

Two bolts 99 each extend through a plate 16, the tongue 192 of the indicating plate 19, the fifth hole 155, the two dividers 17, the third hole 145, another two dividers 17', the second hole 132 and threadedly engages with the inner threaded periphery of the tube 121 corresponding thereto wherein the first rod 113 extends higher than the first extending plate 131 and lower than the second extending plate 141. Both of the vertical portion 112 of the first indicating needle 11 and a second indicating needle 151 extending from the third extending plate 154 extend through the passing hole 191 of the indicating plate 19.

A cap 18 has a transparent plate 180 disposed to a front end thereof and a rear end of the cap 18 is an open end so as to receive the base portion 10 therein, the transparent plate 180 having a sixth hole 181 defined in a center thereof. A threaded rod 183 is disposed through the sixth hole 181 of the transparent plate 180 and has a core 184 slidably disposed through the threaded rod 183, the core 184 having a transverse bar 182 connected to an end thereof in the cap 18 and a nut 185 threadedly engaged with the threaded rod 183 form outside of the cap 18.

A push rod 186 extends through the nut 185 and is engaged to the other end of the core 184 such that when pushing the push rod 186 into the cap 18, the transverse bar 182 is lowered so as to rotate the second indicating needle 151 together with the second extending plate 141 to set a preset pressure via the control means in the base portion. A current pressure is indicated by a movement of the first indicating needle 11 which will push the first extending plate 131 by the first rod 113, when a protrusion 133 extending from a distal end of the first extending plate 131 contacts the stop rod 144, the first extending plate 131 is then magnetically connected to the magnetic element 142 which is fixed at a preset position. Therefore, the pressure will not increase via the control means.

Although the invention has been explained in relation to its preferred embodiment, it is to be understood that many other possible modifications and variations can be made without departing from the spirit and scope of the invention as hereinafter claimed.

What is claimed is:

1. A pressure gauge comprising:

a base portion having a front surface and a rear surface, two pipe connections extending separately from a periphery thereof, said front surface having two first holes and a central hole defined therein;

a first indicating needle having an L-shaped configuration with a horizontal portion and a vertical portion wherein a protrusion extends from said horizontal portion and is rotatably received in said central hole, a first rod extending from said horizontal portion;

a frame, being a longitudinal element, and having two lugs each extending laterally from a side thereof so as to be fixedly disposed on said front surface of said base by extending a bolt through each of said lugs and threadedly engaging with said first holes corresponding thereto, said frame having two tubes extending upwardly therefrom and each of said tubes having an inner threaded periphery defined therein;

a first activating bar being a longitudinal element and having a first extending plate pivotally connected to one end thereof, said first activating bar having two second holes defined therein;

a second activating bar being a longitudinal element and having a second extending plate pivotally connected to one end thereof, said second extending plate having a magnetic element disposed on a distal end, said second activating bar having two third holes defined therein, said second extending plate having a fourth hole defined therein;

a preset bar being a longitudinal element and having a third extending plate pivotally connected to one end thereof, said third extending plate having a second rod perpendicularly disposed thereto, said second rod comprising a front section extending from a front surface of said third extending plate and a rear section extending from a rear surface of said third extending plate, said rear section of said second rod being received in said fourth hole of said second extending plate, said preset bar having two fifth holes defined therein, an indicating plate having a front surface with at least one mark disposed on said indicating plate front surface and a passing hole defined therein, a tongue extending inwardly and radially from an inner periphery defining said passing hole;

two bolts each extending through said tongue of said indicating plate, said fifth holes, said third holes, said second holes and threadedly engaged with said inner threaded periphery of said tubes corresponding thereto wherein said first rod extends higher than said first extending plate and lower than said second extending plate, said vertical portion of said first indicating needle and a second indicating needle extending from said third extending plate both extending through said passing hole of said indicating plate;

a cap having a transparent plate disposed on a front end thereof and a rear end of said cap being an open end so as to receive said base portion therein, said transparent plate having a sixth hole defined in a center thereof;

a threaded rod disposed through said sixth hole of said transparent plate and having a core slidably disposed through said threaded rod, said core having a transverse bar connected to an end thereof in said cap and a nut threadedly engaged with said threaded rod from outside of said cap, and a push rod extending through said nut and engaged to the other end of said core such that when pushing said push rod into said cap, said transverse bar is lowered so as to engage said front section of said second rod perpendicularly disposed on said third extending plate, and rotate said second indicating needle together with said second extending plate.

* * * * *